United States Patent
Johnson et al.

(10) Patent No.: US 12,292,000 B1
(45) Date of Patent: May 6, 2025

(54) THERMAL MANAGEMENT SYSTEMS HAVING AN OIL TANK COMPRISING SOLID-SOLID PHASE CHANGE MATERIAL FOR GAS TURBINE ENGINES

(71) Applicant: General Electric Company, Schenectady, NY (US)

(72) Inventors: Steven Douglas Johnson, Milford, OH (US); Chirag Kataria, Bengaluru (IN); Sanjay Vijayaraghavan, Bengaluru (IN); Paul Joseph Kreitzer, West Chester, OH (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/591,414

(22) Filed: Feb. 29, 2024

(51) Int. Cl.
F02C 7/14 (2006.01)

(52) U.S. Cl.
CPC .......... *F02C 7/14* (2013.01); *F05D 2260/207* (2013.01); *F05D 2260/213* (2013.01)

(58) Field of Classification Search
CPC ...... F02C 7/06; F02C 7/12; F02C 7/14; F02C 7/16; F01D 25/12; F01D 25/125; F01D 25/18; F01M 5/002; F01M 5/004; F28D 20/0056; F16N 19/00; F05D 2260/207
See application file for complete search history.

(56) References Cited

U.S. PATENT DOCUMENTS

| | | | |
|---|---|---|---|
| 7,971,437 B2 | 7/2011 | Flynn et al. | |
| 9,909,448 B2 * | 3/2018 | Gerstler | F01D 9/04 |
| 10,677,537 B2 | 6/2020 | Kitou et al. | |
| 11,273,900 B2 | 3/2022 | White | |
| 11,685,542 B2 | 6/2023 | Niergarth et al. | |
| 2004/0148922 A1* | 8/2004 | Pinkerton | F02C 7/08 60/670 |
| 2007/0264133 A1* | 11/2007 | Schwarz | F01D 25/18 62/7 |
| 2011/0162829 A1* | 7/2011 | Xiang | F28C 3/005 165/234 |
| 2014/0083076 A1* | 3/2014 | Phillips | F01M 5/002 60/39.08 |
| 2014/0157791 A1* | 6/2014 | Saha | F01D 17/141 60/785 |
| 2014/0216003 A1* | 8/2014 | Phillips | F02K 9/64 60/39.08 |
| 2015/0369542 A1* | 12/2015 | Minvielle | F28D 20/028 165/10 |
| 2016/0281603 A1* | 9/2016 | Appukuttan | F02C 7/224 |
| 2017/0314471 A1* | 11/2017 | Sennoun | F28D 15/02 |
| 2020/0256253 A1* | 8/2020 | Sawyers-Abbott | F02C 7/24 |
| 2022/0025782 A1* | 1/2022 | Widstrom | F01D 25/18 |
| 2022/0235671 A1 | 7/2022 | Rambo | |

FOREIGN PATENT DOCUMENTS

| | | |
|---|---|---|
| CN | 101844184 B | 5/2012 |
| CN | 205113730 U | 3/2016 |
| CN | 108561992 A | 9/2018 |

* cited by examiner

*Primary Examiner* — Alain Chau
(74) *Attorney, Agent, or Firm* — Dority & Manning, P.A.

(57) ABSTRACT

A thermal management system for a gas turbine engine includes an oil tank, a pump in fluid communication with the oil tank configured to generate a flow of oil from the oil tank, at least one heat exchanger downstream of the oil tank, and one or more thermal loads downstream of the at least one heat exchanger. The oil tank is formed from a solid-solid phase change material.

20 Claims, 7 Drawing Sheets

THERMAL MANAGEMENT SYSTEMS HAVING AN OIL TANK COMPRISING SOLID-SOLID PHASE CHANGE MATERIAL FOR GAS TURBINE ENGINES

FIELD

The present disclosure relates to thermal management systems for gas turbine engines.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Gas turbine engines typically incorporate the use of one or more thermal management systems to control thermal energy of various fluids passing through various components of the gas turbine engines. However, thermal management systems that improve cooling of thermal fluid, such as oil, flowing through a lubrication system are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds, pressures or temperatures within an engine or thermal management system, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

The terms "coupled," "fixed," "attached to," and the like refer to both direct coupling, fixing, or attaching, as well as indirect coupling, fixing, or attaching through one or more intermediate components or features, unless otherwise specified herein.

The present disclosure is generally related to thermal management systems for gas turbine engines. In some example embodiments, the thermal management systems are associated with lubrication systems. For example, the thermal management system may be configured to absorb heat from thermal fluid, such as oil, circulating through components of the gas turbine engine and to reduce a temperature of the thermal fluid. In some example embodiments, the thermal management system uses phase change materials, such as solid-solid phase change materials and solid-liquid phase change materials, to absorb heat from the thermal fluid.

Figure 1:
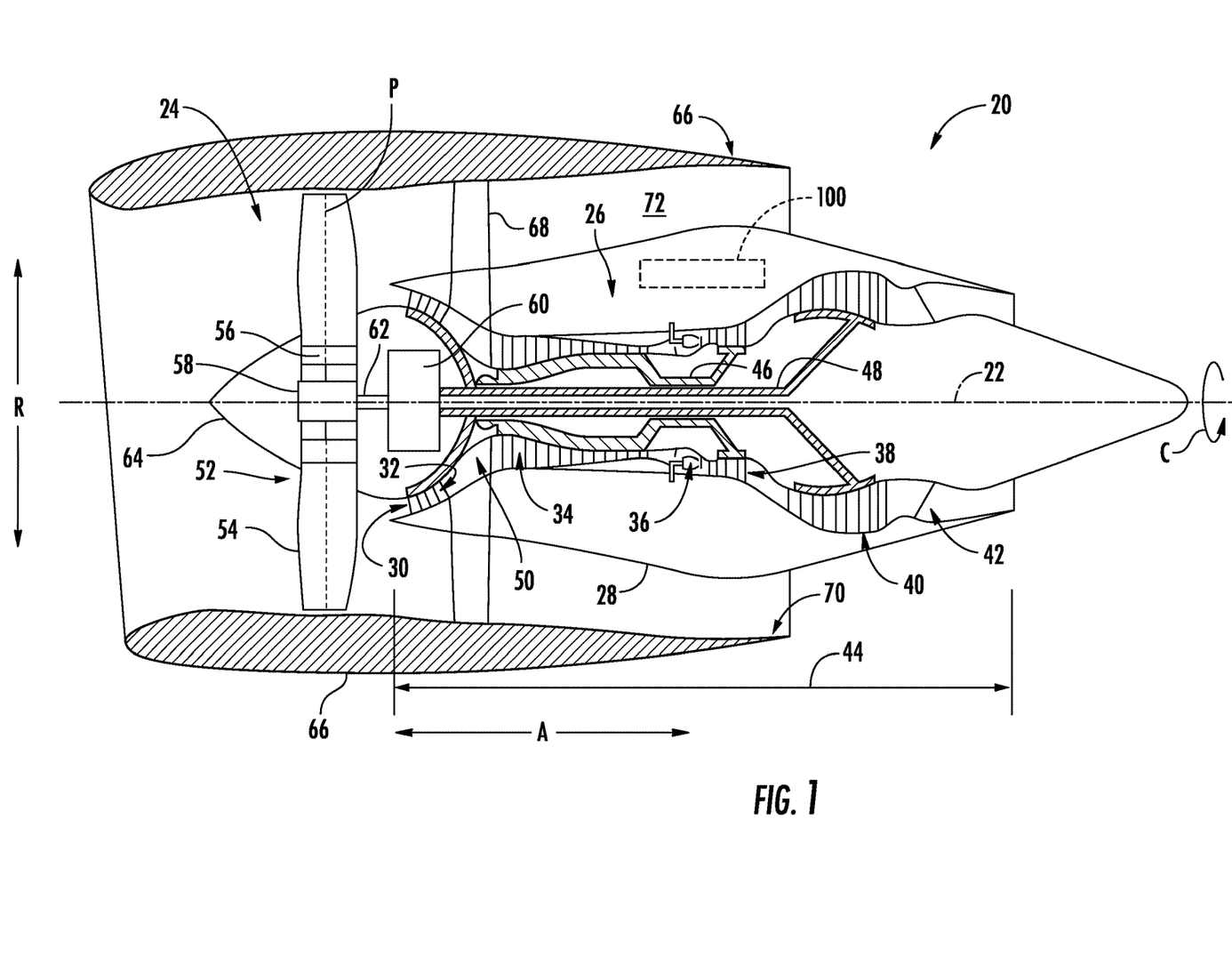
FIG. 1 is a cross-sectional view of a gas turbine engine in accordance with an exemplary aspect of the present disclosure.

Referring now to the drawings, FIG. 1 is a cross-sectional view of a gas turbine engine in accordance with an exemplary aspect of the present disclosure.

In at least one example embodiment, a gas turbine engine 20 is a multi-spool, high-bypass turbofan jet engine, sometimes also referred to as a "turbofan engine." As shown in FIG. 1, the gas turbine engine 20 defines an axial direction "A" (extending parallel to a longitudinal centerline 22 provided for reference), a radial direction "R", and a circumferential direction "C" extending about the longitudinal centerline 22. In general, the gas turbine engine 20 includes a fan section 24 and a turbomachine 26 disposed downstream from the fan section 24.

The turbomachine 26 depicted generally includes an engine housing, casing, or core cowl 28 that defines an annular core inlet 30. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

The turbomachine 26 includes a high-pressure shaft 46 that drivingly connects the high-pressure turbine 38 to the high-pressure compressor 34, and a low-pressure shaft 48 that drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. Each fan blade 54 is rotatable with the disk 56 about a pitch axis P by virtue of the fan blades 54 being operatively coupled to a pitch change mechanism 58 configured to collectively vary the pitch of the fan blades 54, e.g., in unison. The fan blades 54, disk 56, and pitch change mechanism 58 are together rotatable about the longitudinal centerline 22 by the low-pressure shaft 48.

In an exemplary embodiment, as shown in FIG. 1, the gas turbine engine 20 further includes a power gearbox or gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox. Utilizing a reduction gearbox may enable the comparatively higher speed operation of the low-pressure turbine 40 while maintaining fan speeds sufficient to provide for increased air bypass ratios, thereby allowing for efficient operation of the gas turbine engine 20. Moreover, utilizing a reduction gearbox may allow for a reduction in turbine stages that would otherwise be present (e.g., in direct drive engine configurations), thereby providing a reduction in weight and complexity of the engine.

Referring still to the exemplary embodiment of FIG. 1, disk 56 is connected to the gearbox 60 via a fan shaft 62. The disk 56 is covered by a front hub 64 of the fan section 24 (sometimes also referred to as a "spinner"). The front hub 64 is aerodynamically contoured to promote an airflow through the plurality of fan blades 54. Additionally, the fan section 24 includes an annular fan casing or nacelle 66 that circumferentially surrounds the fan 52 and/or at least a portion of the turbomachine 26. The nacelle 66 is supported relative to the turbomachine 26 by a plurality of circumferentially spaced struts or outlet guide vanes 68 in the embodiment depicted. Moreover, a downstream section 70 of the nacelle 66 extends over an outer portion of the turbomachine 26 to define a bypass airflow passage 72 therebetween.

Referring still to FIG. 1, in at least one example embodiment, such as the example embodiment depicted, the gas turbine engine 20 includes a thermal management system 100. The thermal management system 100 may be configured to provide a lubricant to, e.g., various bearings and gear meshes in the compressor section (including the low-pressure compressor 32 and high-pressure compressor 34), the turbine section (including the high-pressure turbine 38 and the low-pressure turbine 40), the high-pressure shaft 46, the low-pressure shaft 48, and the gearbox 60. The lubricant provided by the thermal management system 100 may increase the useful life of such components and may remove a certain amount of heat from such components.

Figure 2:
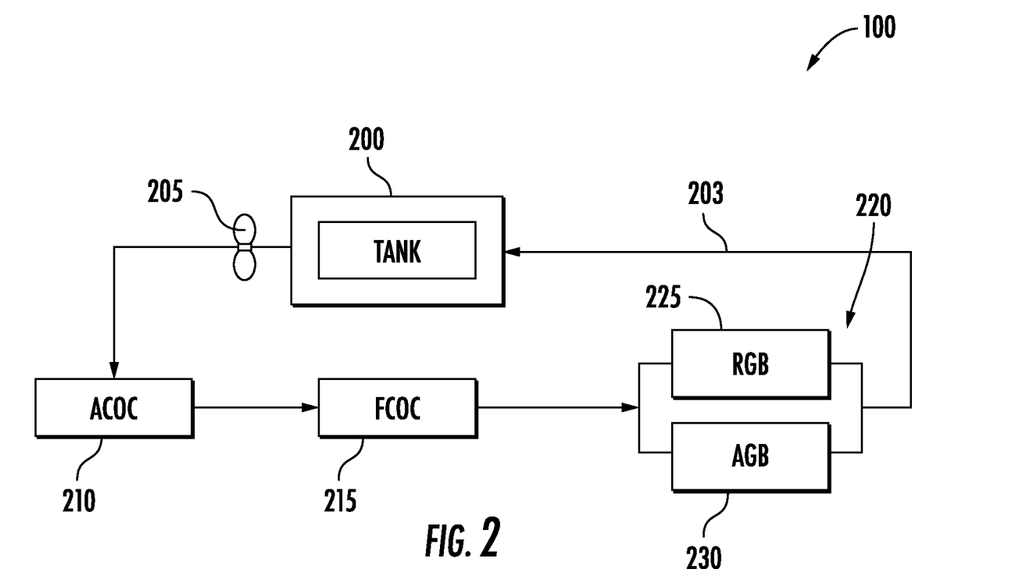
FIG. 2 is a schematic diagram of a thermal management system in accordance with an exemplary aspect of the present disclosure.

FIG. 2 is a schematic diagram of a thermal management system in accordance with an exemplary aspect of the present disclosure.

In at least one example embodiment, the thermal management system 100 includes a fluid circuit 203 in fluid communication with an oil source or an oil tank 200, a pump 205, at least one heat exchanger, and one or more thermal loads 220. The at least one heat exchanger may include an air-cooled oil cooler ("ACOC") 210, a fuel-cooled oil cooler ("FCOC") 215, or both the ACOC 210 and the FCOC 215, as shown in FIG. 2. Additionally, the one or more thermal loads 220 may include a reduction gearbox, an accessory gearbox, one or more sumps, or a combination thereof. For example, the one or more thermal loads 220 may include a reduction gearbox ("RGB") 225 and an accessory gearbox ("AGB") 230. The one or more thermal loads may also include the gearbox 60 (shown in FIG. 1).

In at least one example embodiment, the pump 205 is configured to circulate thermal fluid, such as oil, through the fluid circuit 203. For example, the pump 205 generates a flow of oil from the oil tank 200. The at least one heat exchanger, such as one or both of the ACOC 210 and the FCOC 215, are downstream of the oil tank 200. Additionally, the one or more thermal loads 220 are downstream of the at least one heat exchanger. Accordingly, the pump 205 may circulate the oil from the oil tank 200, through the ACOC 210 and the FCOC 215, and through the one or more thermal loads 220 before returning to the oil tank 200.

Figure 3:
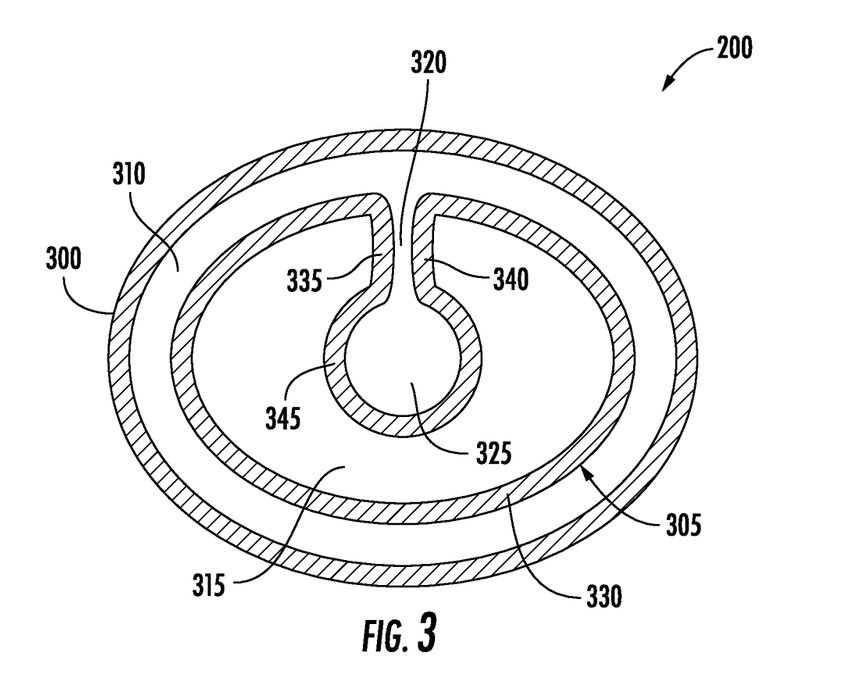
FIG. 3 is a top, cross-sectional view of an oil tank in accordance with an exemplary aspect of the present disclosure.

FIG. 3 is a top, cross-sectional view of an oil tank 200 in accordance with an exemplary aspect of the present disclosure. In one or more example embodiments of the present disclosure, the oil tank 200 may be incorporated into the thermal management system 100 of FIG. 2. Additionally, in at least some example embodiments, the oil tank 200 may be incorporated into the thermal management systems of FIGS. 6 and 9, described below.

In at least one example embodiment, the oil tank 200 includes at least one wall defining a chamber for storing the thermal fluid, such as the oil. For example, the oil tank 200 includes an outer wall 300 and an inner wall 305. The outer wall 300 may circumscribe the inner wall 305. Additionally, the outer wall 300 and the inner wall 305 define a first chamber 310 and the inner wall 305 defines a second chamber 315. The second chamber 315 is configured to store the thermal fluid. The outer wall 300 and the inner wall 305 may each have a substantially cylindrical shape.

In at least one example embodiment, the inner wall 305 defines a recess, which may form a fluid passageway 320 and a fluid core 325 in fluid communication with the fluid passageway 320. The fluid passageway 320 and the fluid core 325 are in fluid communication with the first chamber 310. In at least one example embodiment, the inner wall 305 includes a first wall portion 330, a second wall portion 335, a third wall portion 340 opposite the second wall portion, and a fourth wall portion 345 extending from the second wall portion 335 and the third wall portion 340. The first wall portion 330 has substantially the same shape as the outer wall 300. The second wall portion 335 and the third wall portion 340 extend inwards towards a center of the oil tank 200 and define the fluid passageway 320. The fourth wall portion 345 extends from the second wall portion 335 and the third wall portion 340 to define the fluid core 325. The fourth wall portion 345 has substantially the same shape as the first wall portion 330 and the outer wall 300. Accordingly, the inner wall 305 forms a C-shape, as shown in the top, cross-sectional view of the oil tank 200 in FIG. 3. In at least one example embodiment, the fluid passageway 320 and the fluid core 325 increase the surface area of the inner wall 305 such that the first chamber 310 comes in contact with a greater surface area of the inner wall 305.

In at least one example embodiment, the oil tank 200 is formed from a phase change material ("PCM"). The PCM is configured to act as a heat sink to prevent components of the gas turbine engine 20 from experiencing temperatures above a temperature threshold specific to each of the components. For example, PCMs are configured to absorb heat from the oil stored in and flowing through the oil tank 200. As used herein, PCMs are the materials that have reversible phase change in an operating temperature range and are able to store latent heat at a particular temperature range. The PCMs may absorb heat and change phase. The phase change material may include liquid-solid phase change, solid-solid phase change, liquid-vapor phase change, or a combination thereof.

In at least one example embodiment, one or both of the outer wall 300 and the inner wall 305 may be formed of a solid-solid PCM. Solid-solid PCMs undergo reversible solid-state crystal structure transitions. For example, solid-solid PCMs maintain their shape or structure as opposed to solid-liquid PCMs that change between a solid state and a liquid state. The solid-solid PCMs include metallic alloys having reverse phase change properties that can store heat when temperatures exceed a transition temperature. The solid-solid PCMs may include nickel-based alloys (such as NiTi based alloys including NiTiHf, NiTiPd, NiTiPt, NiTiZr, NiTiCu, and NiTIV), Cobalt based alloys (such as Co—Al, Co—Ni—Al), copper-based alloys (such as CuAlZn and CuAlNi), or a combination thereof. The solid-solid PCMs may also include alloys such as Ni—Al, Ni—Mn, Ni—Mn—Ga, Zr—Cu, TiNb, and U—Nb, having transition temperature between about 212° F. and about 392° F. In at least one example embodiment, the solid-solid PCM comprises an alloy having a latent heat greater than or equal to 3 Btu/lb and less than or equal to 20 Btu/lb. In some example embodiments, the solid-solid PCMs, such as PlusIce X80, X90, X95, X120, X130, have a transition temperature between about 110° F. and about 360° F. and a latent heat between about 55 Btu/lb and about 140 Btu/lb. For example, the solid-solid PCMs, like PlusIce X130, may have a transition temperature greater than or equal to about 266° F. and a latent heat greater than or equal to about 136 Btu/lb.

In at least one example embodiment, a PCM is disposed in the first chamber 310 of the oil tank 200. For example, a solid-liquid PCM may be disposed in the first chamber 310. The solid-liquid PCM may have a transition temperature greater than or equal to about 253° F. and a latent heat greater than or equal to about 146 Btu/lb. For example, the solid-liquid phase change material may comprise organic sugar alcohol PCMs such as Erythritol, D-mannitol, Xylitol, D-sorbitol, paraffins like RT100 and RT110, polyethylene, non-paraffins like Catechol, Quinone, Acetanilide, Succinic anhydride, Benzoic acid, Stibene, Benzamide, salt hydrates (like E117, TH89, and E83), inorganic compounds (like $MgCl_2 \cdot 6H_2O$ and $Mg(NO_3)_2 \cdot 6H_2O$), or a combination thereof. In other example embodiments, the solid-liquid PCM may have a transition temperature between about 165° F. and about 302° F. and a latent heat between about 30 Btu/lb and about 150 Btu/lb. In other example embodiments, a carbon foam matrix is disposed in the first chamber 310. For example, the carbon foam matrix, or other solid foam, includes cells or voids in which the solid-liquid PCM may be disposed. The PCM disposed in the first chamber 310 is configured to provide increased heat absorption from the thermal fluid or oil within the second chamber 315.

In at least one example embodiment, the PCMs forming the outer wall 300 and the inner wall 305 and the PCM disposed in the first chamber 310 are configured to absorb heat from the thermal fluid or oil disposed in the second chamber 315. As discussed above, the increased surface area of the inner wall 305 provides for increased heat absorption from the thermal fluid or oil within the second chamber 315. Integrating the PCM directly within the oil tank 200 can improve oil cooling, especially during times of peak loads on the gas turbine engine 20, such as during take-off and landing. Accordingly, the number and size of thermal management components required to cool the oil is reduced, which provides reduced weight and complexity of the gas turbine engine 20.

In at least one example embodiment, an oil sump in fluid communication with the fluid circuit 203 may also be formed from the PCM. For example, one or more walls of the oil sump may be formed from the same phase change material as the oil tank 200, such as the solid-solid PCM.

Figure 4A:
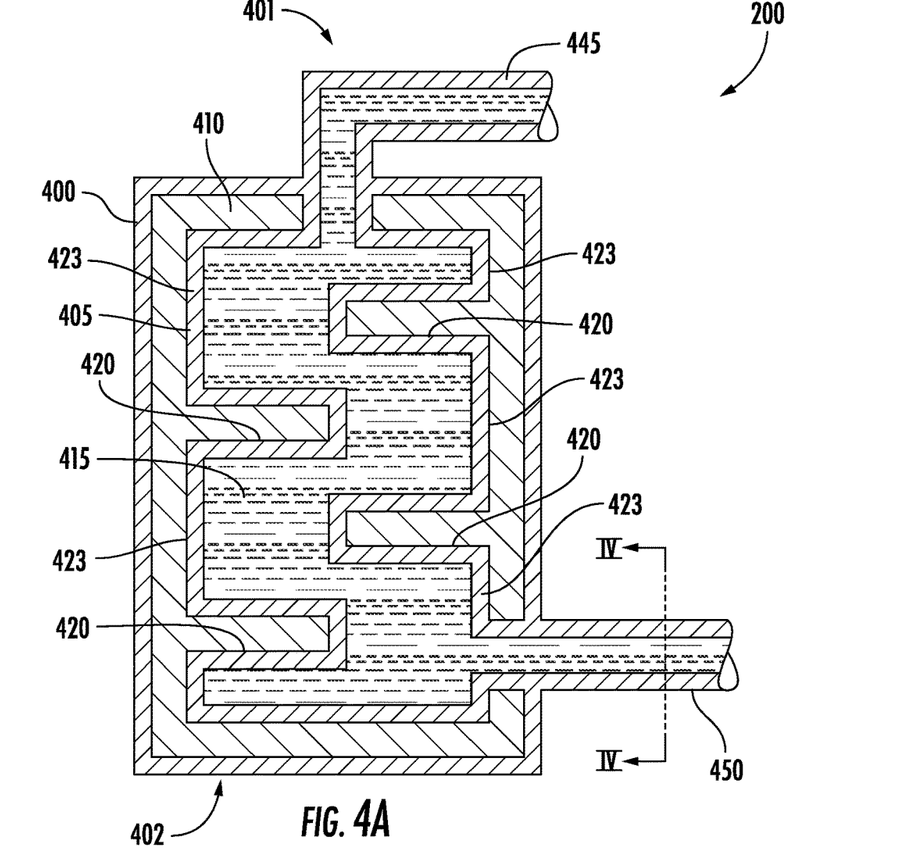
FIG. 4A is a side, cross-sectional view of an oil tank in accordance with an exemplary aspect of the present disclosure.
Figure 4B:
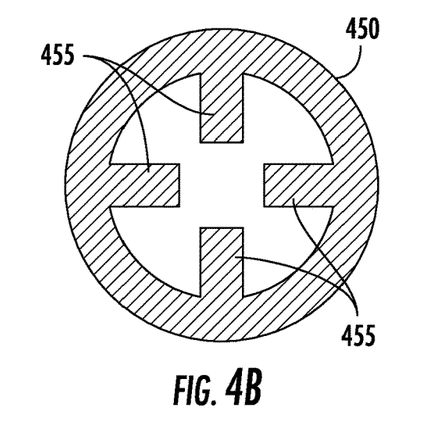
FIG. 4B is a cross-sectional view of tubing of the oil tank of FIG. 4A along line IV-IV in accordance with an exemplary aspect of the present disclosure.

FIG. 4A is a side, cross-sectional view of an oil tank in accordance with an exemplary aspect of the present disclosure. FIG. 4B is a cross-sectional view of tubing of the oil tank of FIG. 4A along line IV-IV in accordance with an exemplary aspect of the present disclosure. In one or more example embodiments of the present disclosure, the oil tank 200 shown in FIGS. 4A-4B may be incorporated into the thermal management system 100 of FIG. 2. Additionally, in at least some example embodiments, the oil tank 200 shown in FIGS. 4A-4B may be incorporated into the thermal management systems of FIGS. 6 and 9, described below.

In at least one example embodiment, the oil tank 200 includes at least one wall defining a chamber for storing the thermal fluid. For example, the oil tank 200 includes an outer wall 400 and an inner wall 405. The outer wall 400 may surround or circumscribe the inner wall 405. Additionally, the outer wall 400 and the inner wall define a first chamber 410 and the inner wall 405 defines a second chamber 415. The second chamber 415 is configured to store the thermal fluid, such as the oil. Moreover, the first chamber 410 and the second chamber 415 are fluidly isolated. In at least one example embodiment, the outer wall 400 and the inner wall 405 may have a substantially cylindrical shape. In other example embodiments, the outer wall 400 and the inner wall 405 may have a cubical or other polygonal shape.

In at least one example embodiment, the inner wall 405 defines a plurality of recesses 420 and a plurality of extensions 423. The plurality of recesses 420 may be formed by portions of the inner wall 405 extending into the second chamber 415. For example, each of the plurality of recesses 420 may be between the plurality of extensions 423. Additionally, the plurality of recesses 420 form at least a portion of the first chamber 410. The plurality of recesses 420 and the plurality of extensions 423 increases a surface area of the inner wall 405 exposed to the first chamber 410.

In at least one example embodiment, the oil tank 200 defines a fluid inlet 445 and a fluid outlet 450. The fluid inlet 445 and the fluid outlet 450 are in fluid communication with the second chamber 415. The fluid inlet 445 may be adjacent a first end 401 of the oil tank 200 and the fluid outlet 450 may be adjacent a second end 402 of the oil tank 200 opposite the first end 401. Additionally, or alternatively, one or both of the fluid inlet 445 and the fluid outlet 450 may be fluidly coupled to the second chamber 415 through a side of the oil tank 200. For example, the fluid outlet 450 may be adjacent the second end 402 and fluidly coupled to the second chamber 415 through a side of the oil tank 200, as shown in FIG. 4A.

In at least one example embodiment, one or both of the outer wall 400 and the inner wall 405 are formed from the solid-solid PCM. For example, the outer wall 400 and the inner wall 405 may be formed from the same solid-solid PCM forming the outer wall 300 and the inner wall 305, as described above with respect to FIG. 3. The PCM forming the outer wall 400 and the inner wall 405 is configured to absorb heat from the thermal fluid or oil stored in and flowing through the oil tank 200.

In at least one example embodiment, a PCM may be disposed in the first chamber 410 of the oil tank 200. For example, the solid-liquid PCM, as described above, may be disposed in the first chamber 410. In other example embodiments, a carbon foam matrix is disposed in the first chamber 410. The PCM disposed in the first chamber 410 is configured to provide increased heat absorption from the thermal fluid or oil within the second chamber 415.

With reference to FIG. 4B, the fluid outlet 450 may include a plurality of protrusions 455 extending from an interior surface of the fluid outlet 450. Additionally, or alternatively, the fluid inlet 445 may include the plurality of protrusions 455 extending from an interior surface of the fluid inlet 445. In at least one example embodiment, the fluid inlet 445, the fluid outlet 450, and the plurality of protrusions 455 are formed of the PCM. For example, the fluid inlet 445, the fluid outlet 450, and the plurality of protrusions 455 are formed of the solid-solid PCM, such as the solid-solid PCM discussed above with respect to FIG. 3. The PCM forming the plurality of protrusions 455 is configured to absorb heat from the thermal fluid or oil as it flows through the fluid inlet 445 and the fluid outlet 450.

Figure 5A:
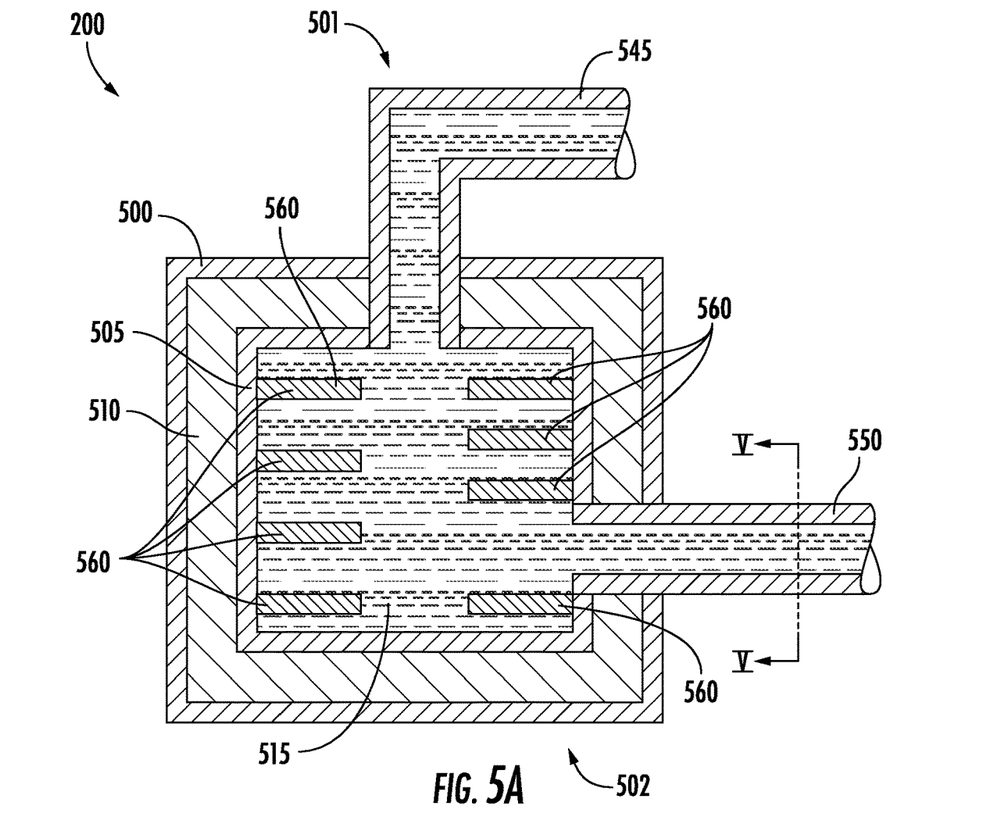
FIG. 5A is a side, cross-sectional view of an oil tank in accordance with an exemplary aspect of the present disclosure.
Figure 5B:
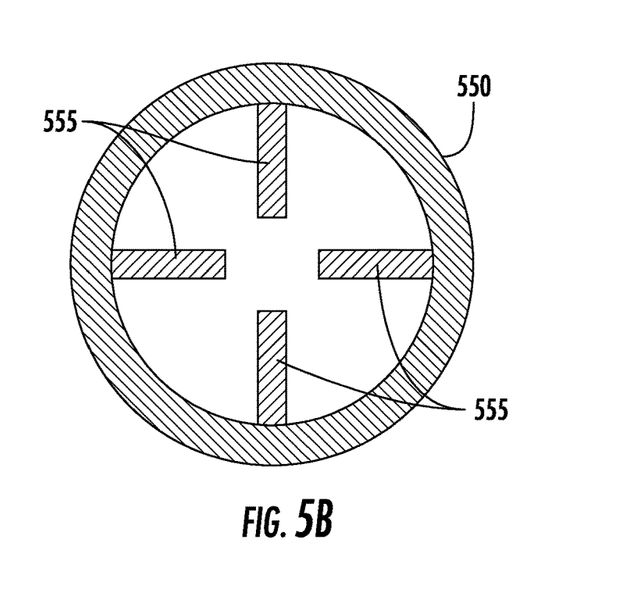
FIG. 5B is a cross-sectional view of tubing of the oil tank of FIG. 5A along line V-V in accordance with an exemplary aspect of the present disclosure.

FIG. 5A is a side, cross-sectional view of an oil tank in accordance with an exemplary aspect of the present disclosure. FIG. 5B is a cross-sectional view of tubing of the oil tank of FIG. 5A along line V-V in accordance with an exemplary aspect of the present disclosure. In one or more example embodiments of the present disclosure, the oil tank 200 shown in FIGS. 5A-5B may be incorporated into the thermal management system 100 of FIG. 2. Additionally, in at least some example embodiments, the oil tank 200 shown in FIGS. 5A-5B may be incorporated into the thermal management systems of FIGS. 6 and 9, described below.

In at least one example embodiment, the oil tank 200 includes at least one wall defining a chamber for storing the thermal fluid. For example, the oil tank 200 includes an outer wall 500 and an inner wall 505. The outer wall 500 may surround or circumscribe the inner wall 505. Additionally, the outer wall 500 and the inner wall 505 define a first chamber 510 and the inner wall 505 defines a second chamber 515. The second chamber 515 is configured to store the thermal fluid, such as the oil. Moreover, the first chamber 510 and the second chamber 515 are fluidly isolated. In at least one example embodiment, the outer wall 500 and the inner wall 505 have a substantially cylindrical shape. In other example embodiments, the outer wall 500 and the inner wall 505 may have a cubical or other polygonal shape.

In at least one example embodiment, one or both of the outer wall 500 and the inner wall 505 are formed from a solid-solid PCM. For example, the outer wall 500 and the inner wall 505 may be formed from the same solid-solid PCM forming the outer wall 300 and the inner wall 305, as described above with respect to FIG. 3. The PCM forming the outer wall 500 and the inner wall 505 is configured to absorb heat from the thermal fluid or oil stored in and flowing through the oil tank 200.

In at least one example embodiment, a plurality of rods 560 are disposed within the second chamber 515. For example, each of the plurality of rods 560 may be coupled to an interior surface of the inner wall 505 and extend into the second chamber 515. The plurality of rods 560 may include a plurality of fins coupled to the interior surface of the inner wall 505 and extending into the second chamber 515. The plurality of rods 560 may also include a plurality of fluid conduits coupled to the interior surface of the inner wall 505 and extending into the second chamber 515. In at least one example embodiment, one or more of the plurality of rods 560 are solid. In other example embodiments, one or more of the plurality of rods 560 are hollow.

In at least one example embodiment, each of the plurality of rods 560 are formed from a PCM. For example, the plurality of rods 560 may be formed from a solid-solid PCM. The solid-solid PCM may be the same solid-solid PCM forming one or both of the outer wall 500 and the inner wall 505. In other example embodiments, the plurality of rods 560 may be formed from a solid-solid PCM that is different from the solid-solid PCM forming one or both of the outer wall 500 and the inner wall 505. In still other example embodiments, one or more of the plurality of rods 560 may be formed from a solid-liquid PCM, such as a solid-liquid PCM discussed above with respect to FIG. 3. The plurality of rods 560 formed from the PCM are configured to increase heat absorption from the thermal fluid within the second chamber 515 in order to reduce the temperature of the thermal fluid.

In at least one example embodiment, a PCM may be disposed in the first chamber 510 of the oil tank 200. For example, the solid-liquid PCM, as described above with respect to FIG. 3, may be disposed in the first chamber 510. In other example embodiments, a carbon foam matrix is disposed in the first chamber 510. The PCM disposed in the first chamber 510 is configured to further increase heat absorption from the thermal fluid or oil within the second chamber 515.

In at least one example embodiment, the oil tank 200 defines a fluid inlet 545 and a fluid outlet 550. The fluid inlet 545 and the fluid outlet 550 are in fluid communication with the second chamber 515. The fluid inlet 545 may be adjacent a first end 501 of the oil tank 200 and the fluid outlet 550 may be adjacent a second end 502 of the oil tank 200 opposite the first end 501. Additionally, or alternatively, one or both of the fluid inlet 545 and the fluid outlet 550 may be fluidly coupled to the second chamber 415 through a side of the oil tank 200. For example, the fluid outlet 450 may be adjacent the second end 502 and fluidly coupled to the second chamber 515 through a side of the oil tank 200, as shown in FIG. 5A.

With reference to FIG. 5B, the fluid outlet 550 may include a plurality of protrusions 555 extending from an interior surface of the fluid outlet 550. Additionally, or alternatively, the fluid inlet 545 may include the plurality of protrusions 555 extending from an interior surface of the fluid inlet 545. In at least one example embodiment, the fluid inlet 545, the fluid outlet 550, and the plurality of protrusions 555 are formed from the PCM. For example, the fluid inlet 545, the fluid outlet 550, and the plurality of protrusions 555 are formed from the solid-solid PCM, such as the solid-solid PCM discussed above with respect to FIG. 3. The PCM forming the plurality of protrusions 555 is configured to absorb heat from the thermal fluid or oil as it flows through the fluid inlet 545 and the fluid outlet 550.

In one or more exemplary embodiments of the present disclosure, the thermal management system 100 including the oil tank 200 in accordance with one or more embodiments of the present disclosure (e.g., the oil tank 200 in FIGS. 2-5B) may be capable of maintaining a temperature of the oil flowing therethrough below a threshold temperature during a transient condition of an engine including the thermal management system 100. The transient condition of the engine may include, for example, an acceleration from ground idle to takeoff condition of an aircraft, a climb operating condition of the aircraft, a step climb condition of an aircraft, an acceleration from flight idle to cruise condition of the aircraft, a landing condition of the aircraft, another engine transient condition, or a combination thereof. During such a transient condition, the thermal management system 100 may be configured to receive a first amount of heat from one or more heat sources, such as the one or more thermal loads 220 (e.g., one or both of the RGB 225 and the AGB 230 in the embodiment of FIG. 2) and may be configured to expel a second amount of heat from one or more heat sink heat exchangers (e.g., one or both of the ACOC 210 and the FCOC 215 in the embodiment of FIG. 2). The second amount of heat may be less than the first amount of heat, and at least a portion of a difference between the first and second amounts of heat may be absorbed by the solid-solid phase change material during the transient condition.

Figure 6:
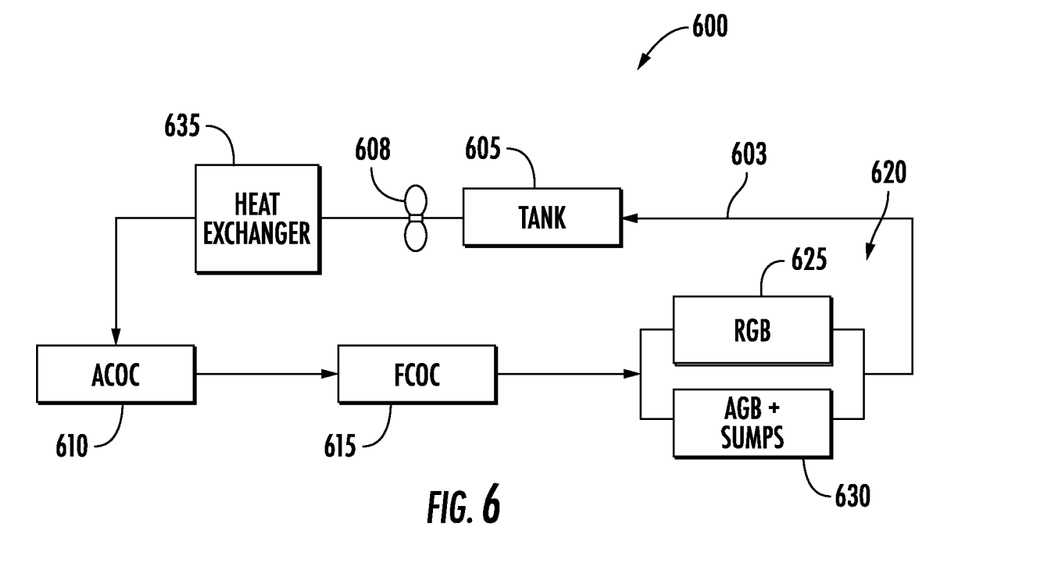
FIG. 6 is a schematic diagram of a thermal management system in accordance with an exemplary aspect of the present disclosure.

FIG. 6 is a schematic diagram of a thermal management system in accordance with an exemplary aspect of the present disclosure.

In at least one example embodiment, a thermal management system 600 includes a fluid circuit 603 in fluid communication with an oil source or oil tank 605, a pump 608, at least one heat exchanger, and one or more thermal loads 620. The at least one heat exchanger may include a first heat exchanger 635, a second heat exchanger 610, a third heat exchanger 615, or a combination thereof. The thermal management system 600 may be used in place of the thermal management system 100, as shown in FIG. 1, in some example embodiments.

In at least one example embodiment, the second heat exchanger 610 may be an air-cooled oil cooler ("ACOC") and the third heat exchanger 615 may be a fuel-cooled oil cooler ("FCOC"). The one or more thermal loads 620 may include one or more of a reduction gearbox, an accessory gearbox, and a sump. For example, the one or more thermal loads 620 may include a reduction gearbox 625 and an accessory gearbox 630. Additionally, the one or more thermal loads 620 may include the gearbox 60 (shown in FIG. 1).

In at least one example embodiment, the pump 608 is configured to circulate thermal fluid, such as oil, through the fluid circuit 603. For example, the pump 608 generates a flow of oil from the oil tank 605. In at least one example embodiment, the first heat exchanger 635 is downstream from the oil tank 605. The second heat exchanger 610 and the third heat exchanger 615 may be downstream of the oil tank 200 and the first heat exchanger 635. Moreover, the one or more thermal loads 620 may be downstream of the first heat exchanger 635, the second heat exchanger 610, and the third heat exchanger 615. Accordingly, the pump 608 may circulate the thermal fluid from the oil tank 605 through the first heat exchanger 635, the second heat exchanger 610, the third heat exchanger 615, and the one or more thermal loads before returning to the oil tank 605.

In at least one example embodiment, the thermal fluid may only flow through the first heat exchanger 635 if a temperature of the thermal fluid exceeds a threshold. For example, the fluid circuit 603 may include a bypass for bypassing the first heat exchanger 635, as will be discussed in greater detail with respect to FIG. 10 below. Accordingly, if the temperature of the thermal fluid does not exceed the threshold, the thermal fluid may flow from the oil tank 605, bypass the first heat exchanger 635, and flow through the second heat exchanger 610, the third heat exchanger 615, and the one or more thermal loads 620 before returning to the oil tank 200.

Figure 7:
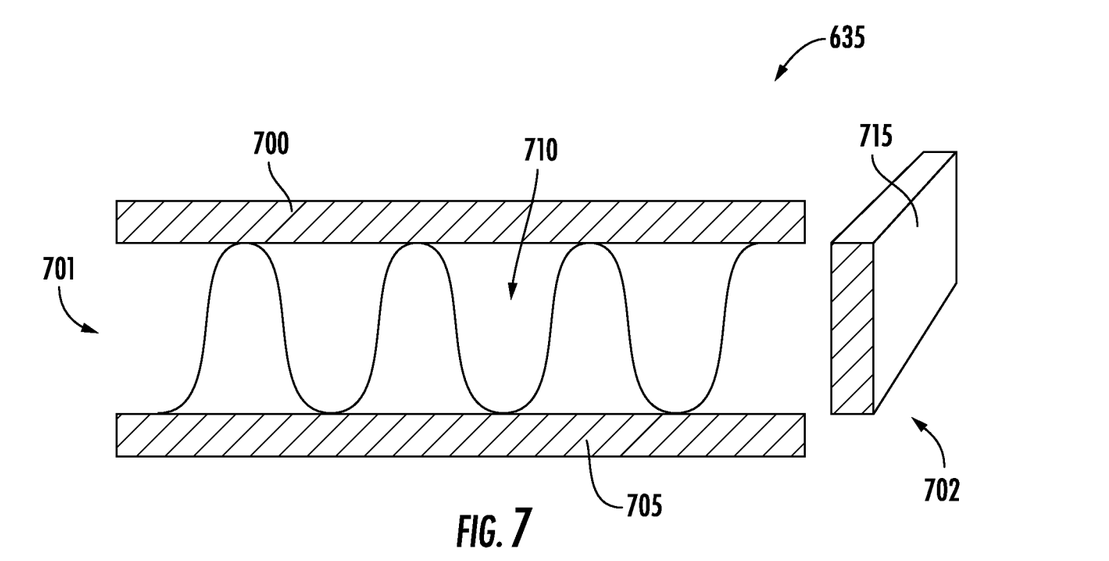
FIG. 7 is a cross-sectional, schematic view of a heat exchanger of the thermal management system of FIG. 6 in accordance with an exemplary aspect of the present disclosure.

FIG. 7 is a cross-sectional, schematic view of a heat exchanger of the thermal management system of FIG. 6 in accordance with an exemplary aspect of the present disclosure.

In at least one example embodiment, the first heat exchanger 635 includes a first plate 700 and a second plate 705 opposite the first plate. The first plate 700 and the second plate 705 define a channel 710 extending between a first end 701 and a second end 702 of the first heat exchanger 635. The channel 710 is configured to be in fluid communication with the fluid circuit 603 such that thermal fluid, such as oil from the oil tank 605, flows through the channel 710.

In at least one example embodiments, at least an exterior portion of the first heat exchanger 635 is formed from a PCM. For example, one or both of the first plate 700 and the second plate 705 of the first heat exchanger 635 are formed from the solid-solid PCM. The solid-solid PCM may be the same solid-solid PCM discussed above with respect to FIG. 3. Additionally, or alternatively, one or more side plates of the first heat exchanger 635 may be formed from the solid-solid PCM material. For example, the first heat exchanger may include a side plate 715 adjacent the second end 702. Another side plate (not shown) may be positioned adjacent the first end 701 of the first heat exchanger 635 opposite the side plate 715. The solid-solid PCM forming the first heat exchanger 635 is configured to absorb heat from the thermal fluid as it flows through the channel 710.

Figure 8:
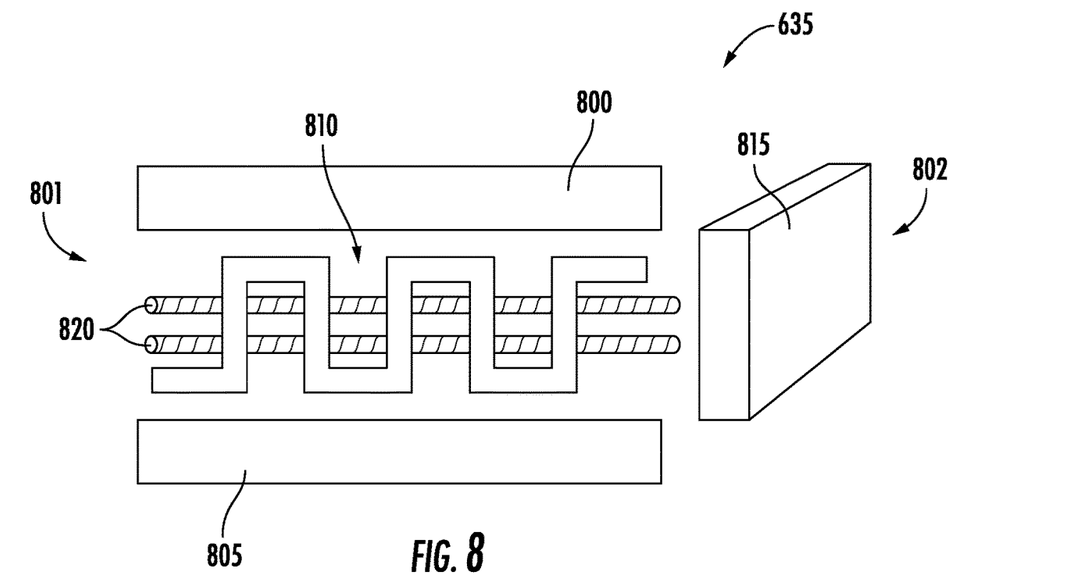
FIG. 8 is a cross-sectional, schematic view of a heat exchanger of the thermal management system of FIG. 6 in accordance with an exemplary aspect of the present disclosure.

FIG. 8 is a cross-sectional, schematic view of a heat exchanger of the thermal management system of FIG. 6 in accordance with an exemplary aspect of the present disclosure.

In at least one example embodiment, the first heat exchanger 635 is embedded with the PCM. For example, the solid-solid PCM discussed above with respect to FIG. 3 may be disposed within the first heat exchanger 635.

In at least one example embodiment, the first heat exchanger 635 includes a first plate 800 and a second plate 805 opposite the first plate. The first plate 800 and the second plate 805 define a channel 810 extending between a first end 801 and a second end 802 of the first heat exchanger 635. The channel 810 is configured to be in fluid communication with the fluid circuit 603 such that thermal fluid, such as oil, from the oil tank 605 flows through the channel 810. Additionally, the first heat exchanger 635 may include one or more side plates defining at least a portion of the channel 810. For example, a side plate 815 may be adjacent the second end 802 of the first heat exchanger 635. Another side plate (not shown) may also be positioned adjacent the first end 801 of the first heat exchanger 635 opposite the side plate 815.

In at least one example embodiment, a plurality of rods 820 are disposed within the channel 810 of the first heat exchanger. For example, the plurality of rods 820 may extend between the first end 801 and the second end 802 of the first heat exchanger 635. In at least one example embodiment, each of the plurality of rods 820 are formed from the solid-solid PCM. The plurality of rods 820 are configured to absorb heat from the thermal fluid as it flows though the channel 810.

Figure 9:
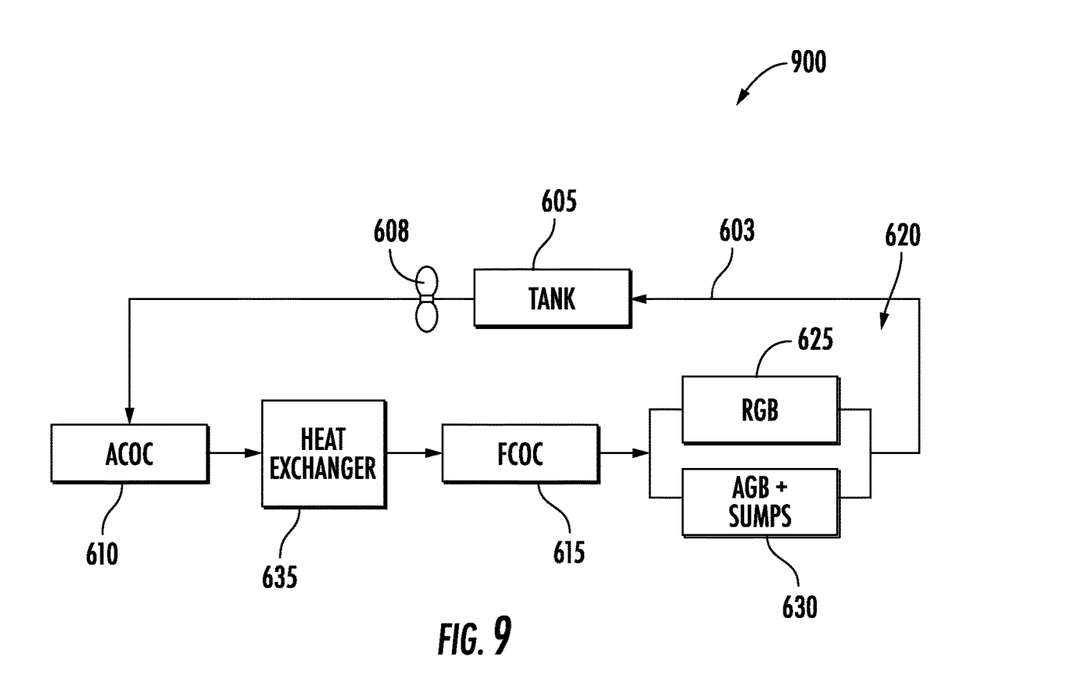
FIG. 9 is a schematic diagram of a thermal management system in accordance with an exemplary aspect of the present disclosure.

FIG. 9 is a schematic diagram of a thermal management system in accordance with an exemplary aspect of the present disclosure.

In at least one example embodiment, a thermal management system 900 may be used in place of the thermal management system 100 of FIG. 1. The thermal management system 900 may be similar or analogous to the thermal management system 600. For example, the thermal management system 900 includes the fluid circuit 603 in fluid communication with the oil tank 605, the pump 608, the first heat exchanger 635, the second heat exchanger 610, the third heat exchanger 615, and the one or more thermal loads 620. However, the first heat exchanger 635 of the thermal management system 900 is downstream of the second heat exchanger 610 and upstream of the third heat exchanger 615. In other example embodiments, the first heat exchanger 635 and the second heat exchanger 610 may be integral and upstream of the third heat exchanger 615.

Figure 10:
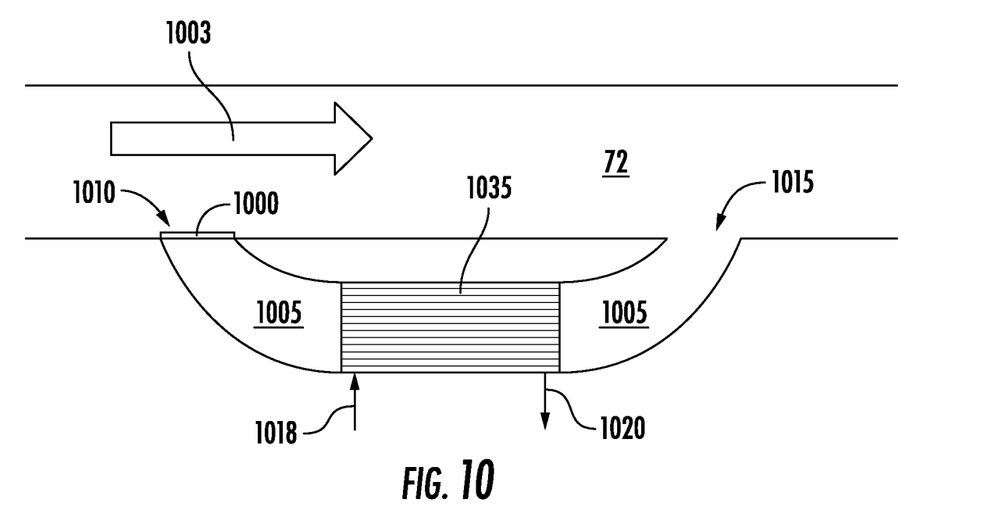
FIG. 10 is a schematic diagram of a heat exchanger within a thermal management system in accordance with an exemplary aspect of the present disclosure.

FIG. 10 is a schematic diagram of a heat exchanger within a thermal management system in accordance with an exemplary aspect of the present disclosure.

In at least one example embodiment, a heat exchanger 1035 is in fluid communication with a bypass airflow of the gas turbine engine. For example, the heat exchanger 1035 may be in fluid communication with the bypass airflow passage 72. In at least one example embodiment, the heat exchanger 1035 comprises an ACOC. For example, the heat exchanger 1035 is configured to receive air from the bypass airflow passage 72, as will be discussed below, to boost cooling of the thermal fluid flowing through the heat exchanger 1035. The heat exchanger 1035 may be similar or analogous to the first heat exchanger 635 discussed above with respect to FIGS. 6-9. For example, the heat exchanger 1035 may be in fluid communication with the fluid circuit 603, discussed with respect to FIGS. 6 and 9.

In at least one example embodiment, the heat exchanger 1035 is disposed in a secondary airflow passage 1005 in fluid communication with the bypass airflow passage 72. A valve 1000 is positioned at a first end 1010 of the secondary airflow passage 1005 and configured to selectively allow a cooling airflow 1003 from the bypass airflow passage 72 to enter the secondary airflow passage and flow through the heat exchanger 1035. The valve 1000 may be opened to allow the cooling airflow 1003 to enter the secondary airflow passage 1005 to boost cooling of the thermal fluid flowing through the first heat exchanger 635 when a storage capacity of the first heat exchanger 635 is reached. The valve 1000 may also be opened to allow the cooling airflow 1003 to enter the secondary airflow passage 1005 based on a temperature of the oil at an outlet of the heat exchanger 1035, a temperature of the heat exchanger 1035 adjacent the outlet of the heat exchanger 1035, or a combination thereof. In other example embodiments, the valve 1000 may be a door actuatable between an open position and a closed position to selectively allow the cooling airflow 1003 from the bypass airflow passage 72 to enter the secondary airflow passage 1005 and the first heat exchanger 635.

In at least one example embodiment, the thermal fluid enters the first heat exchanger 635 through a fluid inlet 1018, flows through a thermal fluid passageway defined within the heat exchanger 1035, and exits the heat exchanger 1035 through a fluid outlet 1020. When the valve 1000 is opened, the cooling airflow 1003 may enter the heat exchanger 1035 from the secondary airflow passage 1005 adjacent the first end 1010, flow through a cooling passageway defined within the heat exchanger 1035, and exit the heat exchanger 1035 into the secondary airflow passage 1005 adjacent the second end 1015. The cooling passageway is fluidly isolated from the thermal fluid passageway. The cooling airflow 1003 flowing through the cooling passageway is configured to absorb heat from the thermal fluid flowing through the thermal fluid passageway. The secondary airflow passage 1005 may be fluidly coupled with the bypass airflow passage 72 at the second end 1015 such that the cooling airflow 1003, which has now been heated by the thermal fluid within the heat exchanger 1035, may be discharged through the bypass airflow passage 72.

Figure 11:
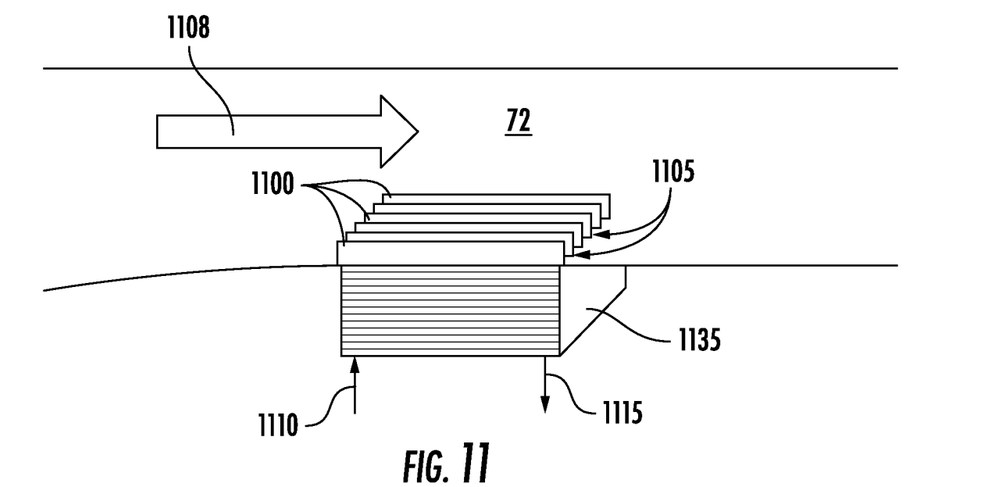
FIG. 11 is a schematic diagram of a heat exchanger within a thermal management system in accordance with an exemplary aspect of the present disclosure.

FIG. 11 is a schematic diagram of a heat exchanger within a thermal management system in accordance with an exemplary aspect of the present disclosure.

In at least one example embodiment, a heat exchanger 1135 is in fluid communication with a bypass airflow of the gas turbine engine. For example, the heat exchanger 1135 may be in fluid communication with the bypass airflow passage 72. In at least one example embodiment, the heat exchanger 1135 comprises a surface heat exchanger, such as a surface ACOC. Additionally, the heat exchanger 1135 may be similar or analogous to the first heat exchanger 635 discussed above with respect to FIGS. 6-9. For example, the heat exchanger 1135 may be in fluid communication with the fluid circuit 603, discussed with respect to FIGS. 6 and 9.

In at least one example embodiment, the heat exchanger 1135 is a surface ACOC including a plurality of fins 1100 extending from a surface of the heat exchanger 1135 into the bypass airflow passage 72. The plurality of fins 1100 may be spaced apart to define a plurality of channels 1105 between the plurality of fins 1100. Each of the plurality of channels 1105 may be in fluid communication with a cooling airflow 1108 flowing through the bypass airflow passage 72.

In at least one example embodiment, the thermal fluid enters the first heat exchanger 635 through a fluid inlet 1110, flows through a thermal fluid passageway defined within the first heat exchanger 635, and exits the first heat exchanger 635 through a fluid outlet 1115. The cooling airflow 1108 flows through the bypass airflow passage 72, flows through the plurality of channels 1105 defined between the plurality of fins 1100, and absorbs heat from the thermal fluid flowing through the first heat exchanger 635. The cooling airflow 1108, which has now been heated by the thermal fluid, may then exit the gas turbine engine 20 via the bypass airflow passage 72.

Accordingly, thermal management systems of gas turbine engines in accordance with exemplary embodiments of the present disclosure may incorporate PCMs, such as solid-solid PCMs, solid-liquid PCMs, or a combination thereof. The PCMs may be included in an oil tank, in one or more heat exchangers downstream of the oil tank, or both. The PCMs are configured to absorb heat from thermal fluid, such as oil from the oil tank, circulating through components of the gas turbine engine and reduce a temperature of the thermal fluid.

Further aspects are provided by the subject matter of the following clauses:

A thermal management system for a gas turbine engine, comprising: an oil tank; a pump in fluid communication with the oil tank configured to generate a flow of oil from the oil tank; at least one heat exchanger downstream of the oil tank; and one or more thermal loads downstream of the at least one heat exchanger; wherein the oil tank is formed from a solid-solid phase change material.

The thermal management system of any preceding clause, wherein: the oil tank comprises a wall formed of the solid-solid phase change material; and the wall defines a chamber configured to store the oil.

The thermal management system of any preceding clause, wherein the wall defines a plurality of recesses.

The thermal management system of any preceding clause, further comprising: a plurality of rods extending from an interior surface of the wall; wherein the plurality of rods are formed from the solid-solid phase change material.

The thermal management system of any preceding clause, wherein the oil tank comprises: an outer wall; and an inner wall; wherein the outer wall and the inner wall define a first chamber; and wherein the inner wall defines a second chamber fluidly isolated from the first chamber.

The thermal management system of any preceding clause, wherein the outer wall is formed from the solid-solid phase change material.

The thermal management system of any preceding clause, wherein the inner wall is formed from the solid-solid phase change material.

The thermal management system of any preceding clause, wherein: the outer wall is formed from the solid-solid phase change material; and the inner wall is formed from the solid-solid phase change material.

The thermal management system of any preceding clause, wherein: the first chamber includes a solid-liquid phase change material; and the second chamber includes the oil.

The thermal management system of any preceding clause, wherein the solid-liquid phase change material comprises a material having a transition temperature between 165° F. and 305° F. and a latent heat between 30 Btu/lb and 200 Btu/lb.

The thermal management system of any preceding clause, wherein the first chamber includes a solid foam defining a plurality of cells, and wherein the solid-liquid phase change material is disposed in the plurality of cells of the solid foam.

The thermal management system of any preceding clause, wherein: the oil tank defines a fluid inlet and a fluid outlet; and the fluid inlet and the fluid outlet include a plurality of protrusions extending from an interior surface of the fluid inlet and the fluid outlet.

The thermal management system of any preceding clause, wherein the plurality of protrusions are formed from the solid-solid phase change material.

The thermal management system of any preceding clause, wherein the at least one heat exchanger comprises: a first oil cooler including an air-cooled oil cooler; and a second oil cooler including a fuel-cooled oil cooler.

The thermal management system of any preceding clause, wherein the one or more thermal loads comprise a reduction gearbox, an accessory gearbox, one or more sumps, or a combination thereof.

The thermal management system of any preceding clause, wherein the solid-solid phase change material comprises a material having a transition temperature between 200° F. and 305° F. and a latent heat between 3 Btu/lb and 200 Btu/lb.

The thermal management system of any preceding clause, wherein the solid-solid phase change material is configured to absorb heat from the oil.

The thermal management system of any preceding clause, wherein the oil tank is configured to maintain a temperature of the oil below a threshold temperature during a transient condition of the gas turbine engine.

The thermal management system of any preceding clause, wherein the transient condition comprises an acceleration from ground idle to takeoff condition of an aircraft, a climb operating condition of the aircraft, a step climb condition of an aircraft, an acceleration from flight idle to cruise condition of the aircraft, a landing condition of the aircraft, another engine transient condition, or a combination thereof.

A gas turbine engine, comprising: a fan; a turbomachine operably coupled to the fan for driving the fan, the turbomachine comprising a compressor section, a combustion section, and a turbine section in serial flow order and together defining a working gas flow path; and the thermal management system of any preceding clause.

A thermal management system for a gas turbine engine, comprising: an oil tank; a pump configured to generate a flow of oil from the oil tank; a first heat exchanger downstream of the oil tank; a second heat exchanger downstream of the oil tank; and one or more thermal loads downstream of the first heat exchanger and the second heat exchanger; wherein the first heat exchanger includes a solid-solid phase change material.

The thermal management system of any preceding clause, wherein at least a portion of an exterior of the first heat exchanger is formed from the solid-solid phase change material.

The thermal management system of any preceding clause, wherein the first heat exchanger is embedded with the solid-solid phase change material.

The thermal management system of any preceding clause, wherein: the first heat exchanger comprises a plurality of rods extending between a first end and a second end opposite the first end of the first heat exchanger; and the plurality of rods are formed from the solid-solid phase change material.

The thermal management system of any preceding clause, wherein the first heat exchanger is downstream of the oil tank and upstream of the second heat exchanger.

The thermal management system of any preceding clause, wherein the first heat exchanger is downstream of the second heat exchanger and upstream of the one or more thermal loads.

The thermal management system of any preceding clause, wherein the second heat exchanger comprises an air-cooled oil cooler or a fuel-cooled oil cooler.

The thermal management system of any preceding clause, further comprising: a third heat exchanger, the third heat exchanger comprising an air-cooled oil cooler or a fuel-cooled oil cooler; wherein the first heat exchanger is downstream of the second heat exchanger and upstream of the third heat exchanger.

The thermal management system of any preceding clause, wherein: the first heat exchanger is configured to be in fluid communication with a bypass airflow of the gas turbine engine.

The thermal management system of any preceding clause, further comprising a valve configured to selectively allow the bypass airflow to flow through the first heat exchanger.

The thermal management system of any preceding clause, wherein: the first heat exchanger comprises a surface heat exchanger; and the surface heat exchanger including a plurality of fins extending into the bypass airflow of the gas turbine engine.

The thermal management system of any preceding clause, wherein: the first heat exchanger includes a first wall and a second wall spaced apart from the first wall and defining a chamber between the first wall and the second wall; a solid-liquid PCM disposed in the chamber; and oil in communication with the first wall or the second wall.

A gas turbine engine, comprising: a fan; a turbomachine operably coupled to the fan for driving the fan, the turbomachine comprising a compressor section, a combustion section, and a turbine section in serial flow order and together defining a working gas flow path; and the thermal management system of any preceding clause.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A thermal management system for a gas turbine engine including a compressor section, a combustion section, and a turbine section in serial flow order and at least partially defining a working gas flow path, the thermal management system comprising:
   an oil tank comprising a solid-solid phase change material, a solid-liquid phase change material, or both the solid-solid phase change material and the solid-liquid phase change material, wherein the oil tank comprises at least one wall formed of the solid-solid phase change material;
   a pump in fluid communication with the oil tank, the pump configured to generate a flow of oil from the oil tank;
   at least one heat exchanger positioned downstream of the oil tank; and
   one or more thermal loads positioned downstream of the at least one heat exchanger.

2. The thermal management system of claim 1, wherein: the at least one wall defines a chamber configured to store the oil.

3. The thermal management system of claim 1, wherein the at least one wall defines a plurality of recesses.

4. The thermal management system of claim 1, further comprising:
   a plurality of rods extending from an interior surface of the at least one wall;
   wherein the plurality of rods are formed from the solid-solid phase change material.

5. The thermal management system of claim 1, wherein the at least one wall of the oil tank comprises:
   an outer wall; and
   an inner wall;
   wherein the outer wall and the inner wall define a first chamber; and
   wherein the inner wall defines a second chamber fluidly isolated from the first chamber.

6. The thermal management system of claim 5, wherein the outer wall is formed from the solid-solid phase change material.

7. The thermal management system of claim 5, wherein the inner wall is formed from the solid-solid phase change material.

8. The thermal management system of claim 5, wherein:
   the outer wall is formed from the solid-solid phase change material; and
   the inner wall is formed from the solid-solid phase change material.

9. The thermal management system of claim 5, wherein:
   the first chamber includes the solid-liquid phase change material; and
   the second chamber includes the oil.

10. The thermal management system of claim 9, wherein the solid-liquid phase change material comprises a material having a transition temperature between 165° F. and 305° F. and a latent heat between 30 Btu/lb and 200 Btu/lb.

11. The thermal management system of claim 9, wherein the first chamber includes a solid foam defining a plurality of cells, and wherein the solid-liquid phase change material is disposed in the plurality of cells of the solid foam.

12. The thermal management system of claim 1, wherein:
   the oil tank defines a fluid inlet and a fluid outlet; and
   the fluid inlet and the fluid outlet each include a plurality of protrusions extending from an interior surface of the fluid inlet and the fluid outlet.

13. The thermal management system of claim 12, wherein the plurality of protrusions are formed from the solid-solid phase change material.

14. The thermal management system of claim 1, wherein the at least one heat exchanger comprises:
   a first oil cooler including an air-cooled oil cooler; and
   a second oil cooler including a fuel-cooled oil cooler.

15. The thermal management system of claim 1, wherein the one or more thermal loads comprise a reduction gearbox, an accessory gearbox, one or more sumps, or a combination thereof.

16. The thermal management system of claim 1, wherein the solid-solid phase change material comprises a material having a transition temperature between 200° F. and 305° F. and a latent heat between 3 Btu/lb and 200 Btu/lb.

17. The thermal management system of claim 1, wherein the solid-solid phase change material is configured to absorb heat from the oil.

18. The thermal management system of claim 1, wherein the oil tank is configured to maintain a temperature of the oil below a threshold temperature during a transient condition of the gas turbine engine.

19. The thermal management system of claim 18, wherein the transient condition comprises an acceleration from ground idle to takeoff condition of an aircraft, a climb operating condition of the aircraft, a step climb condition of the aircraft, an acceleration from flight idle to cruise condition of the aircraft, a landing condition of the aircraft, another engine transient condition, or a combination thereof.

20. A gas turbine engine, comprising:
   a fan;
   a turbomachine operably coupled to the fan for driving the fan, the turbomachine comprising a compressor section, a combustion section, and a turbine section in serial flow order and together defining a working gas flow path; and
   a thermal management system comprising:
      an oil tank comprising a solid-solid phase change material, a solid-liquid phase change material, or both the solid-solid phase change material and the solid-liquid phase change material, wherein the oil tank comprises at least one wall formed of the solid-solid phase change material,
      a pump in fluid communication with the oil tank, the pump configured to generate a flow of oil from the oil tank,
      at least one heat exchanger positioned downstream of the oil tank, and
      one or more thermal loads positioned downstream of the at least one heat exchanger.

* * * * *